(12) United States Patent
Li et al.

(10) Patent No.: US 11,974,050 B2
(45) Date of Patent: Apr. 30, 2024

(54) DATA SIMULATION METHOD AND DEVICE FOR EVENT CAMERA

(71) Applicant: Beihang University, Beijing (CN)

(72) Inventors: Jia Li, Beijing (CN); Daxin Gu, Beijing (CN); Yunshan Qi, Beijing (CN); Qinping Zhao, Beijing (CN)

(73) Assignee: Beihang University, Beijing (CN)

( * ) Notice: Subject to any disclaimer, the term of this patent is extended or adjusted under 35 U.S.C. 154(b) by 112 days.

(21) Appl. No.: 17/865,986

(22) Filed: Jul. 15, 2022

(65) Prior Publication Data
US 2022/0377235 A1 Nov. 24, 2022

(30) Foreign Application Priority Data
Sep. 17, 2021 (CN) .......................... 202111092647.8

(51) Int. Cl.
*H04N 5/232* (2006.01)
*H04N 5/355* (2011.01)
*H04N 23/80* (2023.01)
*H04N 25/57* (2023.01)

(52) U.S. Cl.
CPC ............. *H04N 23/80* (2023.01); *H04N 25/57* (2023.01)

(58) Field of Classification Search
CPC ........ H04N 23/80; H04N 25/57; H04N 23/60; H04N 19/42; G06N 3/045; G06N 3/08
See application file for complete search history.

(56) References Cited

U.S. PATENT DOCUMENTS

2019/0065880 A1* 2/2019 Loginov ................ G06V 20/62

* cited by examiner

*Primary Examiner* — Alazar Tilahun

(57) ABSTRACT

The embodiments of the present disclosure disclose data simulation method and device for event camera. A specific embodiment of the method includes: decoding the video to be processed to obtain a video frame sequence; inputting a target video frame to a fully convolutional network UNet to obtain event camera contrast threshold distribution information; sampling each pixel in the target video frame to obtain an event camera contrast threshold set; performing processing on the event camera contrast threshold set and the video frame sequence, to obtain the simulated event camera data; performing generative adversarial learning on the simulated event camera data and event camera shooting data, to obtain updated event camera contrast threshold distribution information; generating simulated event camera data. The present disclosure is a computer vision system that can be widely applied to such fields as national defense and military, film and television production, public security, and etc.

10 Claims, 4 Drawing Sheets

Step 201, perform data processing on the simulated event camera data and the pre-acquired event camera shooting data to obtain an event characterization information

Step 202, perform divide-and-conquer processing on the event characterization information to obtain divided and conquered event characterization information

Step 203, use the plurality of discriminator network models mentioned above to determine whether the event characterization information of the plurality of characterization blocks meets the preset condition, and update the event camera contrast threshold distribution information according to the pre-obtained data distribution, to obtain an updated event camera contrast threshold distribution information

FIG. 2

DATA SIMULATION METHOD AND DEVICE FOR EVENT CAMERA

CROSS-REFERENCE TO RELATED APPLICATIONS

The present application is based on, and claims priority from, Chinese application number 2021110926478, filed Sep. 17, 2021, the disclosure of which is hereby incorporated by reference herein in its entirety.

FIELD OF THE INVENTION

The present disclosure relates to the field of computer vision and multimodal generation, and in particular to data simulation method and device for event camera.

BACKGROUND OF THE INVENTION

Due to its imaging principle, an event camera has such advantages as high dynamic range and low time delay etc. over traditional color cameras. It has a wide range of prospects of application in the fields of national defense and military, film and television production, public security, and etc. However, event cameras are expensive nowadays, so commercial products are not widely available yet. Using the event data simulation generation algorithm to generate a large amount of event camera data quickly and cheaply by simulation is of great significance in image restoration, video surveillance, smart city and other application fields.

SUMMARY OF THE INVENTION

The content of the present disclosure is to introduce ideas in a brief form, and these ideas will be described in detail in the following section of the detailed description of the invention. The content of the present disclosure is not intended to identify the key features or essential features of the claimed technical solution, nor is it intended to limit the scope of the claimed technical solution.

According to the above-mentioned actual needs and key problems, the purpose of the present disclosure is to: propose a data simulation method for an event camera, input a video frame sequence to be processed, adaptively generate event camera contrast threshold distribution information, and output a simulated event camera data through pseudo-parallel event data simulation generation processing.

Some embodiments of the present disclosure provide a data simulation method for an event camera, the method comprising: decoding an acquired video to be processed to obtain a video frame sequence; inputting a target video frame from the video frame sequence to a fully convolutional network UNet to extract an event camera contrast threshold distribution information corresponding to the target video frame, thereby obtaining the event camera contrast threshold distribution information; based on the event camera contrast threshold distribution information, sampling each pixel in the target video frame to generate an event camera contrast threshold, to obtain an event camera contrast threshold set; performing pseudo-parallel event data simulation generation processing on the event camera contrast threshold set and the video frame sequence to obtain simulated event camera data; performing generative adversarial learning on the simulated event camera data and pre-acquired event camera shooting data, to update the event camera contrast threshold distribution information, to obtain an updated event camera contrast threshold distribution information, wherein a similarity between the updated event camera contrast threshold distribution information and the real data of the target domain is greater than a first predetermined threshold; based on the updated event camera contrast threshold distribution information, the video frame sequence and a preset noise signal, generating the simulated event camera data, wherein the simulated event camera data is data whose similarity with the pre-acquired event camera shooting data is greater than a second predetermined threshold.

Some embodiments of the present disclosure provide a data simulation device for an event camera, the device comprising: a decode unit configured to decode an acquired video to be processed to obtain a video frame sequence; an input unit configured to input a target video frame from the video frame sequence into a fully convolutional network UNet to extract an event camera contrast threshold distribution information corresponding to the target video frame, thereby obtaining the event camera contrast threshold distribution information; a sampling unit configured to, based on the event camera contrast threshold distribution information, sample each pixel in the target video frame to generate an event camera contrast threshold, and obtain an event camera contrast threshold set; a pseudo-parallel event data simulation generation processing unit configured to perform pseudo-parallel event data simulation generation processing on the event camera contrast threshold set and the video frame sequence to obtain simulated event camera data; a generative adversarial learning unit configured to perform generative adversarial learning on the simulated event camera data and pre-acquired event camera shooting data, to update the event camera contrast threshold distribution information, to obtain an updated event camera contrast threshold distribution information, wherein a similarity between the updated event camera contrast threshold distribution information and the real data of the target domain is greater than a first predetermined threshold; a generating unit configured to generate the simulated event camera data based on the updated event camera contrast threshold distribution information, the video frame sequence and a preset noise signal, wherein the simulated event camera data is data whose similarity with the pre-acquired event camera shooting data is greater than a second predetermined threshold.

The method disclosed by the present disclosure utilizes color camera data for event camera data simulation generation. Compared with the performance of the above simulation method relying too much on the quality of the artificially adjusted simulation parameters, it has the following beneficial characteristics: 1) Without relying on the artificial simulated event camera contrast threshold and the contrast threshold noise distribution, a realistic simulated event camera contrast threshold distribution can be obtained through a small amount of real event camera data. 2) No need for complex parameter adjustment and algorithm simulation, and no extra parameters and calculations are added in the process of generating event data by simulation; by estimating the contrast threshold noise, reliable simulation of the event camera data is achieved, and information of real event data per se is used for adaptive learning, thus preventing the distribution of the simulation domain event camera data and the target domain event camera data from differing too much in different scenarios.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

FIG. 2 is a flowchart of other embodiments of a data simulation method for an event camera according to the present disclosure;

DETAILED DESCRIPTION OF THE INVENTION

Figure 1:
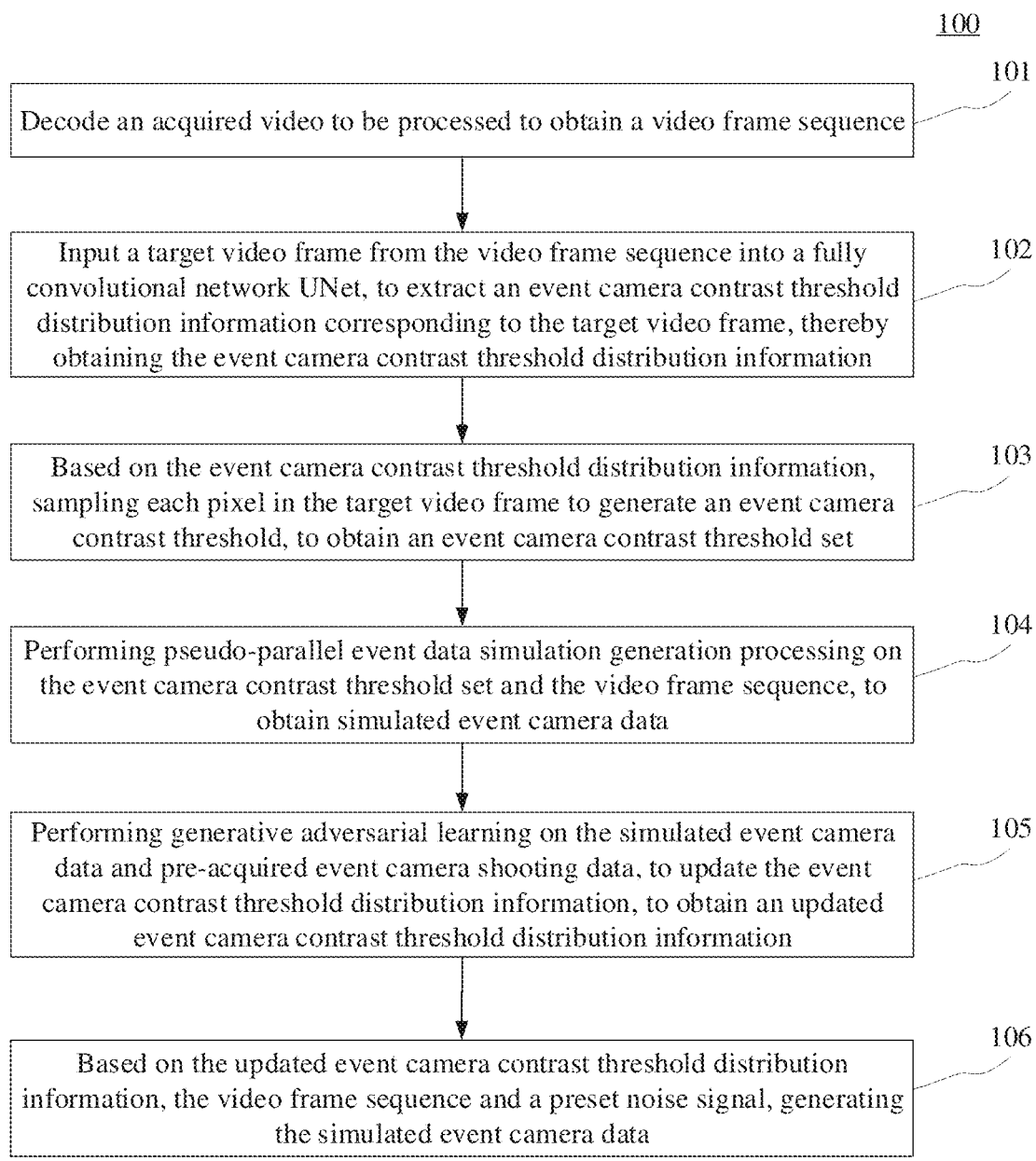
FIG. 1 is a flowchart of some embodiments of a data simulation method for an event camera according to the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no confliction, the embodiments in the present disclosure and the features in the embodiments can be combined with each other.

It should be noted that such adjuncts as "one" and "more" mentioned in the present disclosure are illustrative, not restrictive, and those skilled in the art should understand that, unless the context clearly indicates otherwise, they should be understood as "one or more".

The present disclosure will be described in detail below with reference to the accompanying drawings and in conjunction with embodiments.

FIG. 1 is a flowchart of some embodiments of a data simulation method for an event camera according to the present disclosure.

At step 101, decode the acquired video to be processed to obtain a video frame sequence.

In some embodiments, the execution body of the data simulation method for the event camera may decode the acquired video to be processed to obtain a video frame sequence. The above execution body may acquire the video to be processed through a wired connection or a wireless connection. The video to be processed may be a video in a continuous period of time. If the acquired video frames are many, the acquired video may be cropped to obtain the video to be processed. For the generation of simulated event camera data, the frame rate of the video frame sequence must reach a predetermined threshold, thereby ensuring the effect of event simulation. If the frame rate of the video to be processed does not reach the predetermined threshold, the frame rate of the decoded video frame sequence may be increased by a frame interpolation algorithm or other methods.

Event cameras are a new type of vision sensor. Unlike traditional color cameras, which capture images by recording the brightness received by the photosensitive element within a certain exposure time, event cameras record changes in brightness. When the brightness change of a pixel exceeds the contrast threshold of an event camera, the event camera will record the pixel coordinates generated by the threshold, the time, and the polarity of the event (brightness increase is positive polarity, and brightness decrease is negative polarity). The basic principle of simulating event camera data is to simulate the way of a real event camera recording data, compare the frames before and after the video sequence, and record the event whenever the corresponding pixel brightness change exceeds the threshold. At present, some works have been done to try to use color camera data to generate event camera data by simulation. For example, in 2018, Rebecq of ETH Zurich first proposed a reliable method for simulating event camera data. This method is the first to propose a contrast threshold of the event camera, which is not fixed but noisy, and uses a Gaussian distribution to fit the noise. And it is also proposed that the occurrence time of the simulation event should be distributed among the simulated video frame sequences, not the occurrence time of the video frame. In 2020, Hu of ETH Zurich proposed a more refined method for simulating event camera data. This method points out there is a phenomenon that some events may not be recorded due to the limited light sensing bandwidth of the event camera under dark light conditions. And a low-pass filter is designed to simulate the optical sensing bandwidth limitation. In addition, the method further proposes an event camera temporal noise model and an event camera leakage noise model based on Poisson distribution, which further enhances the reliability of the simulated event data.

At step 102, input a target video frame from the video frame sequence into a fully convolutional network UNet to extract event camera contrast threshold distribution information corresponding to the target video frame, thereby obtaining the event camera contrast threshold distribution information.

In some embodiments, the above execution body may input a target video frame from the video frame sequence into a fully convolutional network UNet to extract event camera contrast threshold distribution information corresponding to the above target video frame, thereby obtaining the event camera contrast threshold distribution information.

Figure 3:
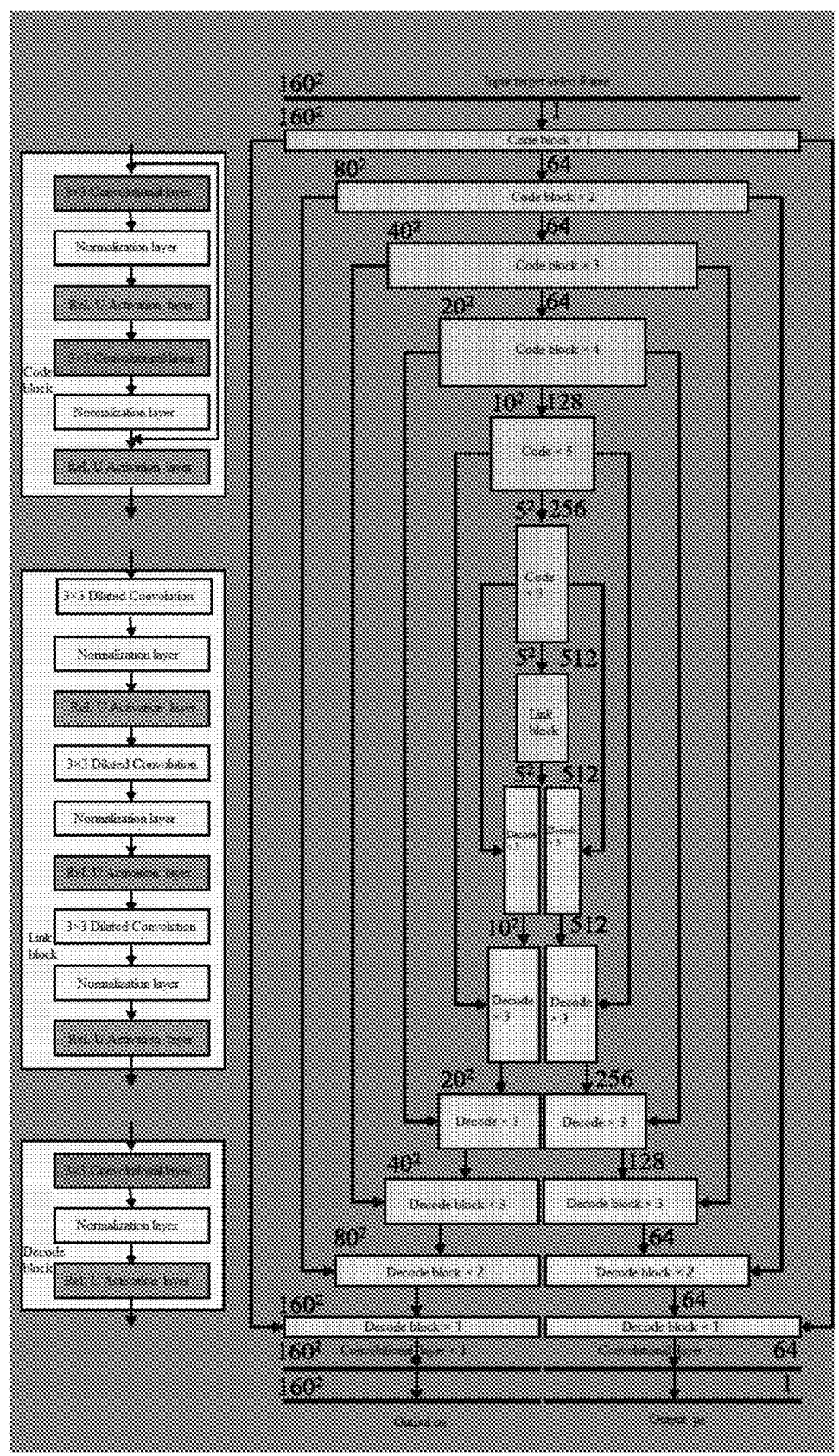
FIG. 3 is a schematic diagram of extracting event camera contrast threshold distribution information according to the present disclosure.

FIG. 3 is a schematic diagram of extracting event camera contrast threshold distribution information according to the present disclosure. As shown in FIG. 3, the extraction of extract event camera contrast threshold distribution information may have the following characteristics: for the inputted video frame sequence, every 10 frames are selected as a group and inputted into a fully convolutional network UNet. The fully convolutional network UNet is a network of a U-shaped neural network structure. The selected group of video frames are inputted into the fully convolutional network UNet, and the final output is the event camera contrast threshold distribution information (for example, Gaussian distribution), that is, the mean $\mu_\theta$ and the standard deviation $\sigma_\theta$. The mean $\mu_\theta$ can be a matrix. The standard deviation $\sigma_\theta$ can be a matrix. $\theta$ represents the event camera contrast threshold distribution information.

In certain optional implementations of some embodiments, the event camera contrast threshold distribution information includes a mean matrix and a standard deviation matrix. The UNet consists of one shared encoder and two independent decoders. The shared encoder and the two independent decoders are connected by a short connection.

As an example, the event camera contrast threshold distribution information may specifically refer to two matrices whose width is the width of the image and height is the height of the image. One matrix is the mean matrix and the other matrix is the standard deviation matrix. Then, take the values in the corresponding coordinate positions of the two matrices (for example, the position where the coordinates are 1, 1) to form a normal distribution $\mathcal{N}$ ($\mu_\theta$, $\sigma_\theta$), which is just the event camera contrast threshold distribution information at this position. This event camera contrast threshold distribution information includes event camera contrast threshold distribution information of all coordinate positions in the two matrices.

At step 103, based on the event camera contrast threshold distribution information, sample each pixel in the target video frame to generate an event camera contrast threshold, to obtain an event camera contrast threshold set.

In some embodiments, the above execution body may, based on the event camera contrast threshold distribution information, sample each pixel in the target video frame to generate an event camera contrast threshold, to obtain an event camera contrast threshold set. The above target video frame may be the first video frame in the video frame sequence.

In certain optional implementations of some embodiments, the sampling of each pixel in the target video frame based on the event camera contrast threshold distribution information to generate an event camera contrast threshold may include the following steps:

In the first step, for each pixel p in the target video frame, sample a contrast threshold noise z(p) from a preset standard normal distribution $\mathcal{N}$ =(0, 1), wherein, $\mathcal{N}$ =(0, 1) is a normal distribution with a mean 0 and a standard deviation 1, z(p) represents the sampling contrast threshold noise of p.

In the second step, based on the event camera contrast threshold distribution information $\mathcal{N}$ ($\mu$, $\sigma$), correct the sampling contrast threshold noise to obtain the above pixel's event camera sampling contrast threshold $\theta(p)=\mu(p)+z(p)\times\sigma(p)$, wherein, p represents the above pixel, $\theta(p)$ represents the event camera sampling contrast threshold of p, $\theta( )$ represents the above event camera sampling contrast threshold, $\mu(p)$ represents the mean of p, $\mu( )$ represents the mean, z(p) represents the sampling contrast threshold noise of p, z( ) represents the sampling contrast threshold noise, $\sigma(p)$ represents the standard deviation of p, and $\sigma( )$ represents the standard deviation.

In the third step, truncate the event camera sampling contrast threshold to obtain the event camera contrast threshold $\theta(p)=\max(\theta(p), \epsilon)$, wherein, max(,) means to find the maximum value of two numbers, $\epsilon$ represents the lower limit of the event camera sampling contrast threshold, the value of $\epsilon$ is $\epsilon=0.01$. The event camera sampling contrast threshold may be a positive number. The event camera sampling contrast threshold lower than the predetermined threshold, may produce unrealistic event camera simulation results. Therefore, a lower limit of the event camera sampling contrast threshold is set to ensure the reasonableness of the sampling contrast threshold.

At step 104, perform pseudo-parallel event data simulation generation processing on the event camera contrast threshold set and the video frame sequence to obtain simulated event camera data.

In some embodiments, the above execution body may perform pseudo-parallel event data simulation generation processing on the event camera contrast threshold set and the video frame sequence to obtain simulated event camera data.

In certain optional implementations of some embodiments, the pseudo-parallel event data simulation generation processing is to process adjacent video frames in the inputted video frame sequence to generate a positive event cumulative map and a negative event cumulative map, and determine the obtained positive event cumulative map set and negative event cumulative map set as the simulated event camera data, wherein, the adjacent video frames in the inputted video frame sequence are processed as follows to generate the positive event cumulative map and the negative event cumulative map:

$$\begin{cases} N^{pos}_{t_k \sim t_{k+1}}(p) = h(D_{t_k \sim t_{k+1}}(p)) \\ N^{neg}_{t_k \sim t_{k+1}}(p) = h(-D_{t_k \sim t_{k+1}}(p)) \\ D_{t_k \sim t_{k+1}}(p) = S_{0 \sim t_{k+1}}(p) - S_{0 \sim t_k}(p) \end{cases}$$

Wherein, p represents a pixel, $N^{pos}$ represents a positive event cumulative map, k represents the sequence number of the video frame in the video frame sequence, $t_k$ represents the time point of the event cumulative map of the $k^{th}$ video frame, $t_{k+1}$ represents the time point of the event cumulative map of the k+1$^{th}$ video frame, $N_{t_k \sim t_{k+1}}^{pos}( )$ represents the positive event cumulative map in the time period from $t_k$ to $t_{k+1}$, $N_{t_k \sim t_{k+1}}^{pos}(p)$ represents the positive event cumulative map of p in the time period from $t_k$ to $t_{k+1}$, h( ) represents taking a positive number function, $D_{t_k \sim t_{k+1}}( )$ represents the cumulative number of events in the time period from $t_k$ to $t_{k+1}$, $D_{t_k \sim t_{k+1}}(p)$ represents the cumulative number of events of p in the time period from $t_k$ to $t_{k+1}$, $D_{t_k \sim t_{k+1}}(p)$ is a positive number indicating a positive event cumulative number at p, $D_{t_k \sim t_{k+1}}(p)$ is a negative number indicating a negative event cumulative number at p, $N^{neg}$ represents a negative event cumulative map, $N_{t_k \sim t_{k+1}}^{neg}( )$ represents the negative event cumulative map in the time period from $t_k$ to $t_{k+1}$, $N_{t_k \sim t_{k+1}}^{neg}(p)$ represents the negative event cumulative map of p in the time period from $t_k$ to $t_{k+1}$, $S_{0 \sim t_{k+1}}( )$ represents the cumulative number of events in the time period of 0~$t_{k+1}$, $S_{0 \sim t_{k+1}}(p)$ represents the cumulative number of events of p in the period of 0~$t_{k+1}$, $S_{0 \sim t_k}( )$ represents the cumulative number of events in the time period of 0~$t_k$, $S_{0 \sim t_k}(p)$ represents the cumulative number of events of p in the time period of 0~$t_k$, wherein, $S_{0 \sim t_{k+1}}(p)$ is obtained by the following formula:

$$\begin{cases} S_{0 \sim t_{k+1}}(p) = \text{floor}(\hat{S}_{0 \sim t_{k+1}}(p)) + r_{t_{k+1}}(p) \\ \hat{S}_{0 \sim t_{k+1}}(p) = \dfrac{\log(I_{t_{k+1}}(p)) - \log(I_{t_0}(p))}{\theta(p)} \end{cases}$$

Wherein, floor( ) represents the function of rounding to 0, $\hat{S}_{0 \sim t_{k+1}}( )$ represents the cumulative number of events obtained by calculating the brightness change of $I_{t_{k+1}}(p)$ of the k+1$^{th}$ frame and $I_{t_0}( )$ of the 0$^{th}$ frame in the time period of 0~$t_{k+1}$, $\hat{S}_{0 \sim t_{k+1}}(p)$ represents the cumulative number of events of p obtained by calculating the brightness change of $I_{t_{k+1}}(p)$ of the k+1$^{th}$ frame and $I_{t_0}(p)$ of the 0$^{th}$ frame in the time period of 0~$t_{k+1}$, floor ($\hat{S}_{0 \sim t_{k+1}}(p)$) means rounding $\hat{S}_{0 \sim t_{k+1}}(p)$ towards 0, $r_{t_{k+1}}( )$ represents the event correction function at time $t_{k+1}$, $r_{t_{k+1}}(p)$ represents the event correction value of p at time $t_{k+1}$, log( ) represents a logarithmic function, $I_{t_{k+1}}( )$ represents the brightness value at time $t_{k+1}$, $I_{t_{k+1}}(p)$ represents the brightness value of p in the frame at time $t_{k+1}$, $I_{t_0}( )$ represents the brightness value at time $t_0$, $I_{t_0}(p)$ represents the brightness value of p in the frame at time $t_0$, $\theta(p)$ represents the event camera sampling contrast threshold of p, wherein, $r_{t_{k+1}}(p)$ is obtained by the following formula:

$$r_{t_{k+1}}(p) = \begin{cases} -1, & \text{floor}(\hat{S}_{0 \sim t_{k+1}}(p)) > \text{floor}(\hat{S}_{0 \sim t_k}(p)) \wedge \hat{S}_{0 \sim t_{k+1}}(p) < 0 \\ 1, & \text{floor}(\hat{S}_{0 \sim t_{k+1}}(p)) < \text{floor}(\hat{S}_{0 \sim t_k}(p)) \wedge \hat{S}_{0 \sim t_{k+1}}(p) > 0 \\ r_{t_k}(p), & \text{floor}(\hat{S}_{0 \sim t_k}(p)) = \text{floor}(\hat{S}_{0 \sim t_{k+1}}(p)) \end{cases}$$

Wherein, $\hat{S}_{0 \sim t_k}( )$ represents the cumulative number of events obtained by calculating the brightness change of $I_{t_k}( )$ of the $k^{th}$ frame and $I_{t_0}( )$ of the $0^{th}$ frame in the time period of $0 \sim t_k$, $\hat{S}_{0 \sim t_k}(p)$ represents the cumulative number of events of p obtained by calculating the brightness change of $I_{t_k}(p)$ of the $k^{th}$ frame and $I_{t_k}(p)$ of the $0^{th}$ frame in the time period of $0 \sim t_k$, floor $(\hat{S}_{0 \sim t_k}(p))$ means rounding $\hat{S}_{0 \sim t_k}(p)$ towards 0, $r_{t_k}(p)$ represents the event correction function at time $t_k$, $r_{t_k}(p)$ represents the event correction value of p at time $t_k$. $\wedge$ represents a logical AND operation. When $\hat{S}_{0 \sim t_{k+1}}(p) < 0$, that is, the cumulative events in the time period of $0 \sim t_{k+1}$ are negative events, if the positive event floor $(\hat{S}_{0 \sim t_{k+1}}(p)) > $ floor $(\hat{S}_{0 \sim t_k}(p))$ is generated during the time period $t_k \sim t_{k+1}$, then a positive error will be produced due to the action of the floor( ) function. The above positive error is to record one more positive event. Set $r_{t_{k+1}}(p) = -1$ to correct the positive error. When $\hat{S}_{0 \sim t_{k+1}}(p) > 0$, if a negative event occurs in the time period $t_k \sim t_{k+1}$, then a negative error will be produced. The above negative error is to record one more negative event. Set $r_{t_{k+1}}(p) = 1$ to correct the above negative error. When no event is generated in the time period $0 \sim t_{k+1}$, correction shall be made if correction has been made in the last period of time, and correction shall not be made if no correction has been made in the last period of time. In other cases, no correction shall be made, that is, $r_{t_{k+1}}(p) = 0$.

At step 105, perform generative adversarial learning on the simulated event camera data and pre-acquired event camera shooting data, to update the event camera contrast threshold distribution information, to obtain the updated event camera contrast threshold distribution information.

In some embodiments, the above execution body may perform generative adversarial learning on the simulated event camera data and the pre-acquired event camera shooting data, and update the event camera contrast threshold distribution information through a gradient descent algorithm, to obtain the updated event camera contrast threshold distribution information. Wherein, the similarity between the updated event camera contrast threshold distribution information and the real data of the target domain is greater than a first predetermined threshold.

In certain optional implementations of some embodiments, the above performing generative adversarial learning on the simulated event camera data and the pre-acquired event camera shooting data, to update the event camera contrast threshold distribution information, to obtain the updated event camera contrast threshold distribution information may include the following steps:

See FIG. 2, which is a flowchart of other embodiments of a data simulation method for an event camera according to the present disclosure.

At step 201, perform data processing on the simulated event camera data and the pre-acquired event camera shooting data to obtain event characterization information.

Alternatively, performing data processing on the simulated event camera data and the pre-acquired event camera shooting data to obtain the event characterization information may include the following steps to:

Determine a first positive event cumulative map $M_g^{pos}$ and a first negative event cumulative map $M_g^{neg}$ of the pre-acquired event camera shooting data within a predetermined time period;

Determine a second positive event cumulative map $M_g^{pos}$ and a second negative event cumulative map $M_g^{neg}$ of the simulated event camera data within the predetermined time period.

Use the following formulas to find the gradients for the first positive event cumulative map, the first negative event cumulative map, the second positive event cumulative map and the second negative event cumulative map respectively, to obtain first event characterization information and second event characterization information as the event characterization information:

$$G = |g_x(M)| + |g_y(M)|,$$

Wherein, G represents the event characterization information, $g_x( )$ means to seek the gradient in the direction x of the coordinate axis, and M represents the event cumulative map, that is, a general term of the first positive event cumulative map, the first negative event cumulative map, the second positive event cumulative map, and the second negative event cumulative map. $g_x(M)$ means that M seeks the gradient in the direction x of the coordinate axis, and x represents the horizontal direction of the coordinate axis. $g_y(M)$ means that M seeks the gradient in the direction y of the coordinate axis, and y represents the vertical direction of the coordinate axis. The above coordinate axis takes the upper left corner of the frame as the origin, the direction of the width of the frame to the right as the positive half-axis of the x-axis, and the direction of the height of the frame downward as the positive half-axis of the y-axis, wherein the event characterization information is:

$$\begin{cases} E_r = \{M_r^{pos}, M_r^{neg}, G_r^{pos}, G_r^{neg}\} \\ E_g = \{M_g^{pos}, M_g^{neg}, G_g^{pos}, G_g^{neg}\} \\ E_r \in R^{4 \times H \times W} \\ E_g \in R^{4 \times H \times W} \end{cases},$$

Wherein, $E_r$ represents the first event characterization information, E represents the event characterization information, r represents the pre-acquired event camera shooting data, $M_r^{pos}$ represents the first positive event cumulative map, $M_r^{neg}$ represents the first negative event cumulative map, $G_r^{pos}$ represents the gradient of $M_r^{pos}$, $G_r^{neg}$ represents the gradient of $M_r^{neg}$, $E_g$ represents the second event characterization information, g represents the simulated event camera data, $M_g^{pos}$ represents the second positive event cumulative map, $M_g^{neg}$ represents the second negative event cumulative map. Represents the gradient of $M_g^{pos}$. Represents the gradient of $M_g^{neg}$. R stands for the set of real numbers. H represents the height of the feature. W represents the width of the feature.

Figure 4:
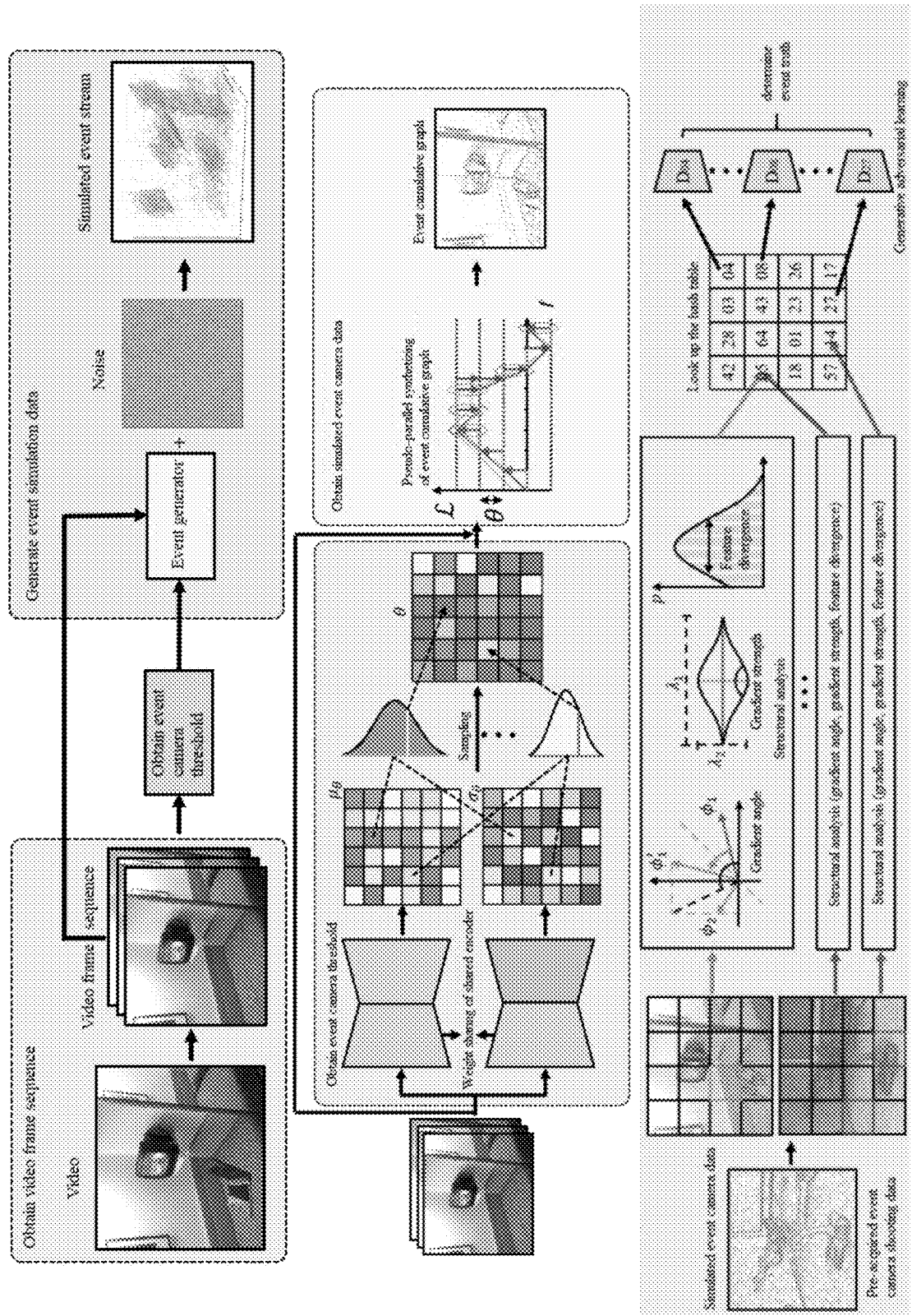
FIG. 4 is a schematic diagram of one application scenario of a data simulation method of an event camera according to some embodiments of the present disclosure.

At step 202, perform divide-and-conquer processing on the event characterization information to obtain the divided and conquered event characterization information. Wherein, the divide-and-conquer processing includes the following steps to: divide the event characterization information into blocks to obtain a plurality of characterization blocks. Perform feature analysis on each of the plurality of characterization blocks to generate a feature hash key value, and obtain a feature hash key value set. Based on the feature hash key value set and a preset hash table, determine a plurality of discriminator network models corresponding to the plurality of characterization blocks, as shown in FIG. 4, and based on the feature hash key value set, find the preset hash table to determine a discriminator network model. Use the plurality of discriminator network models to determine whether the event characterization information of the plurality of characterization blocks satisfies a preset condition. Update the above-mentioned event camera contrast threshold distribution information according to the pre-obtained data distribution to obtain updated event camera contrast threshold distribution information. Wherein, the features in the above feature analysis include: a gradient angle, a gradient strength and a feature divergence.

As an example, the preset hash table may be {k1:d1,k2: d2}, here the k1 and k2 are hash key values, the d1 and d2 are different discriminator network models. The resulting feature hash key set can be {k1,k1,k2,k2}. In other words, by looking up the hash table, the corresponding discriminator network model can be obtained as {d1,d1,d2,d2}.

Alternatively, performing divide-and-conquer processing on the event characterization information to obtain the divided and conquered event characterization information may include the following steps:

The event characterization information E is divided by grid block partition, into 16 blocks of 4×4, resulting in a characterization block $$\mathcal{P} \in R^{4 \times \frac{H}{4} \times \frac{W}{4}},$$

wherein, $\mathcal{P}$ represents the characterization block, R represents the set of real numbers, H represents the height of the feature, and W represents the width of the feature.

Perform structural analysis on the plurality of characterization blocks by means of a hash function. Select a corresponding discriminator network model according to the hash value for subsequent processing. The output result of the discriminator network model corresponding to $\mathcal{P}$ is expressed by the following formula:

$$D(\mathcal{P}) = \Sigma_k ind(s(\mathcal{P})=k) \times D_k(\mathcal{P}),$$

Wherein, $\mathcal{P}$ represents the characterization block, D( ) represents the discriminator network model, D($\mathcal{P}$) represents the output result of the discriminator network model corresponding to $\mathcal{P}$, k represents the sequence number of the discriminator network model, ind( ) represents an indicative function. Its value is 1 when the condition is true, and 0 when the condition is not true. s( ) represents a hash function. s($\mathcal{P}$) represents a return value of $\mathcal{P}$ input into the hash function. $D_k$( ) represents the $k^{th}$ discriminator network model. $D_k(\mathcal{P})$ represents the output result of $\mathcal{P}$ input into the $k^{th}$ discriminator network model. $\Sigma_k$ means summing the output results of all the discriminator network models.

As an example, for any inputted characterization block, the hash function returns a hash value, being equal to k. That is, the value of the indicative function corresponding to the $k^{th}$ discriminator will be 1, while the values of other indicative functions will all be 0. Summing the output results of all the discriminator network models can be equivalent to the finally obtained overall discriminator network model, that is, the result obtained by outputting the characterization block to the $k^{th}$ discriminator.

The number of discriminator network models can be 216, and the discriminator network models can be numbered from 0-215. Whenever a characterization block $\mathcal{P}$ is inputted, s($\mathcal{P}$) will get a value between 0 and 215. For example, if it is 10, then the value of ind (s($\mathcal{P}$)=10) is 1. As for k equaling to other values, the value of the indicative function is always 0.

The analysis steps of the gradient angle and the gradient strength are as follows to:

Determine the gradient of each characterization block, resulting in a gradient matrix.

Determine the feature value $\{\lambda_1, \lambda_2\}$ and the feature vector $\{\phi_1, \phi_2\}$ of the above gradient matrix.

The gradient angle φ and gradient strength γ are calculated by the following formula:

$$\begin{cases} \varphi = \arctan(\phi_1, \phi_2) \\ \gamma = \frac{\sqrt{\lambda_1} - \sqrt{\lambda_2}}{\sqrt{\lambda_1} + \sqrt{\lambda_2}} \\ c(m) = \sum_{p \in P(m)} \sum_{q \in N(p)} \|\nabla_m(p,q)\|^2 \times O[\nabla_m(p,q)] \end{cases}$$

Wherein, φ represents the gradient angle, arctan(,) represents the arc tangent function, arctan($\phi_1, \phi_2$) represents the arc tangent function of $\phi_1$ and $\phi_2$, $\phi_1$ represents the feature vector in the direction x of the coordinate axis, $\phi_2$ represents the feature vector in the direction y of the coordinate axis, γ represents the gradient strength, $\sqrt{\lambda_1}$ represents the square root of the feature value in the direction x of the coordinate axis, $\sqrt{\lambda_2}$ represents the square root of the feature value in the direction y of the coordinate axis, c(m) represents the feature divergence of m, m represents the characterization block, c( ) represents the feature divergence, q represents the neighboring pixel of pixel p, p( ) represents the set of all pixels in the characterization block, P(m) represents the set of all pixels in the $m^{th}$ characterization block, N( ) represents the 4-neighborhood of the pixel, and N(p) represents the 4-neighborhood of the pixel p, represents the gradient of pixel p and the neighboring pixels, $\| \|^2$ means the square of the norm, O[ ] represents a probability, O[$\nabla_m$(p, q)] represents the probability of $\nabla_m$(p, q).

At step 203, use the plurality of discriminator network models mentioned above to determine whether the event characterization information of the plurality of characterization blocks meets the preset condition, and update the event camera contrast threshold distribution information according to the pre-obtained data distribution to obtain the updated event camera contrast threshold distribution information, which can include the following steps:

The gradient angle, gradient strength and feature divergence are quantified into three levels of 24, 3 and 3, respectively.

Set 216 discriminator network models. Wherein, each discriminator network model in the 216 discriminator network models is composed of a multilayer perceptron network structure. The multilayer perceptron network structure consists of three linear layers. The number of channels of each of the three linear layers is 256, 128 and 1, respectively. The number of channels can be the size of the feature vector outputted by each linear layer. That is, the size of the feature vector outputted by the first layer of the three linear layers is 256×1. The second layer output feature vector size is 128×1. The final output feature vector size is 1×1, that is, one value, which is a value between 0~1. Rounded to 0 means that the event characterization map is not from real data, and rounded to 1 means that the event characterization map is from real data. Wherein, the above 216 discriminator network models have different confidence levels due to the different amount of training data. The above event camera contrast threshold distribution information is updated by the following formula:

$$\begin{cases} \omega_k = \alpha \times \dfrac{1}{K} + (1-\alpha) \times \dfrac{S_k}{\sum_k S_k} \\ L_D = \mathcal{E}_{E_r \sim P_r(E_r)}[D(E_r)] - \mathcal{E}_{E_g \sim P_g(E_g)}[D(E_g)] \end{cases}$$

Wherein, $\omega_k$ represents the confidence level of the $k^{th}$ discriminator network model, k represents the sequence number of the discriminator network model, $\omega$ represents the confidence level of the discriminator network model, $\alpha$ represents the equilibrium parameter, the value of $\alpha$ is $\alpha=0.5$, K represents the data trained by the discriminator network model, the value of K is K=216, S represents the amount of data trained by the discriminator network model, $S_k$ represents the amount of data trained by the $k^{th}$ discriminator network model, $\Sigma_k S_k$ represents the summation of the amount of data trained by the above 216 discriminator network models, that is, seeking the total amount of data, $L_D$ represents the adversarial learning loss function of the discriminator network model, L represents the loss function, D represents the adversarial learning of the discriminator network model, $E_r$ represents the first event characterization information, E represents the event characterization information, r represents the pre-acquired event camera shooting data, $P_r()$ represents the data distribution of the pre-acquired event camera shooting data, $P_r(E_r)$ represents the data distribution of the pre-acquired event camera shooting data conforming to $E_r$, P represents the data distribution, D( ) represents the discriminator network model, $E_g$ represents the second event characterization information, g represents the simulated event camera data, $P_g$ ( ) represents the data distribution of the simulated event camera data, $P_g$ ($M_g$) represents the data distribution of the simulated event camera shooting data conforming to $E_g$.

At step 106, generate the simulated event camera data based on the updated event camera contrast threshold distribution information, the video frame sequence and a preset noise signal.

In some embodiments, the above execution body may generate the simulated event camera data based on the updated event camera contrast threshold distribution information, the video frame sequence and a preset noise signal, wherein the simulated event camera data is data whose similarity with the pre-acquired event camera shooting data is greater than a second predetermined threshold.

The process of generating simulated event camera data includes two stages: a training stage and a testing stage (service stage), wherein, at the training stage: performing generative adversarial learning on the simulated event camera data and the pre-acquired event camera shooting data, to update the event camera contrast threshold distribution information, to obtain the updated event camera contrast threshold distribution information; and at the testing stage (service stage): based on the updated event camera contrast threshold distribution information, the video frame sequence and a preset noise signal, generating the simulated event camera data.

In certain optional implementations of some embodiments, the above generating simulated event camera data based on the updated event camera contrast threshold distribution information, the video frame sequence and a preset noise signal may include the following steps to:

In the first step, based on the updated event camera contrast threshold distribution information, perform event camera contrast threshold sampling on each pixel in the various video frames in the video frame sequence to generate an event camera contrast threshold, and obtain an event camera contrast threshold group sequence.

In the second step, perform pseudo-parallel event data simulation generation processing on the event camera contrast threshold group sequence and the video frame sequence to obtain event camera data.

In the third step, add a preset noise signal to the event camera data to obtain the simulated event camera data.

It can be understood that the units recorded in the data simulation device for an event camera correspond to the respective steps in the method described with reference to FIG. 1. Therefore, the operations, features, and beneficial effects described above with respect to the method are also applicable to a data simulation device for an event camera and the units comprised therein, and no details are described herein again.

Although some illustrative embodiments of the present disclosure are described above to help a person having ordinary skill in the art understand the present disclosure, it should be clear that the present disclosure is not limited to the scope of the specific embodiments. To a person having ordinary skill in the art, as only as the variations fall within the limitations of the accompanying claims and the determined spirit and scope of the present disclosure, these variations are obvious. Any invention-creation contrived through the present disclosure is protected.

What is claimed is:

1. A data simulation method for an event camera, comprising:
    decoding an acquired video to be processed to obtain a video frame sequence;
    inputting a target video frame from the video frame sequence to a fully convolutional network UNet, to extract an event camera contrast threshold distribution information corresponding to the target video frame, thereby obtaining the event camera contrast threshold distribution information;
    based on the event camera contrast threshold distribution information, sampling each pixel in the target video frame to generate an event camera contrast threshold, to obtain an event camera contrast threshold set;
    performing pseudo-parallel event data simulation generation processing on the event camera contrast threshold set and the video frame sequence, to obtain simulated event camera data;
    performing generative adversarial learning on the simulated event camera data and pre-acquired event camera shooting data, to update the event camera contrast threshold distribution information, to obtain an updated event camera contrast threshold distribution information, wherein a similarity between the updated event camera contrast threshold distribution information and real data of a target domain is greater than a first predetermined threshold;
    based on the updated event camera contrast threshold distribution information, the video frame sequence and a preset noise signal, generating the simulated event camera data, wherein the simulated event camera data is data whose similarity with the pre-acquired event camera shooting data is greater than a second predetermined threshold.

2. The method of claim 1, wherein the event camera contrast threshold distribution information includes a mean matrix and a standard deviation matrix, the UNet consists of one shared encoder and two independent decoders, the one shared encoder and the two independent decoders are connected by a short connection.

3. The method of claim 2, wherein the sampling each pixel in the target video frame based on the event camera contrast threshold distribution information to generate an event camera contrast threshold, includes:
  for each pixel p in the target video frame, sampling a contrast threshold noise z(p) from a preset standard normal distribution $\mathcal{N} = (0, 1)$, wherein, $\mathcal{N} = (0, 1)$ is a normal distribution with a mean 0 and a standard deviation 1, and z(p) represents the sampling contrast threshold noise of p;
  based on the event camera contrast threshold distribution information $\mathcal{N}(\mu, \sigma)$, correcting the sampling contrast threshold noise to obtain the pixel's event camera sampling threshold $\theta(p) = \mu(p) + z(p) \times \sigma(p)$, wherein, p represents the pixel, $\theta(p)$ represents the event camera sampling contrast threshold of p, $\theta(\ )$ represents the event camera sampling contrast threshold, $\mu(p)$ represents the mean of p, $\mu(\ )$ represents the mean, z(p) represents the sampling contrast threshold noise of p, $z(\ )$ represents the sampling contrast threshold noise, $\sigma(p)$ represents the standard deviation of p, and $\sigma(\ )$ represents the standard deviation;
  truncating the event camera sampling contrast threshold to obtain an event camera contrast threshold $\theta(p) = \max(\theta(p), \epsilon)$, wherein, max(,) means to find a maximum value of two numbers, $\epsilon$ represents a lower limit of the event camera sampling contrast threshold, a value of $\epsilon$ is $\epsilon = 0.01$.

4. The method of claim 3, wherein the pseudo-parallel event data simulation generation processing is to process adjacent video frames in the inputted video frame sequence to generate a positive event cumulative map and a negative event cumulative map, and determine a obtained positive event cumulative map set and negative event cumulative map set as the simulated event camera data, wherein, the adjacent video frames in the inputted video frame sequence are processed as follows to generate the positive event cumulative map and the negative event cumulative map:

$$\begin{cases} N^{pos}_{t_k \sim t_{k+1}}(p) = h(D_{t_k \sim t_{k+1}}(p)) \\ N^{neg}_{t_k \sim t_{k+1}}(p) = h(-D_{t_k \sim t_{k+1}}(p)) \\ D_{t_k \sim t_{k+1}}(p) = S_{0 \sim t_{k+1}}(p) - S_{0 \sim t_k}(p) \end{cases},$$

wherein, p represents a pixel, $N^{pos}$ represents the positive event cumulative map, k represents a sequence number of a video frame in the video frame sequence, $t_k$ represents a time point of the event cumulative map of a $k^{th}$ video frame, $t_{k+1}$ represents a time point of the event cumulative map of a $k+1^{th}$ video frame, $N^{pos}_{t_k \sim t_{k+1}}(\ )$ represents the positive event cumulative map in a time period from $t_k$ to $t_{k+1}$, $N^{pos}_{t_k \sim t_{k+1}}(p)$ represents the positive event cumulative map of p in the time period from $t_k$ to $t_{k+1}$, $h(\ )$ represents taking a positive number function, $D_{t_k \sim t_{k+1}}(\ )$ represents a cumulative number of events in the time period from $t_k$ to $t_{k+1}$, $D_{t_k \sim t_{k+1}}(p)$ represents the cumulative number of events of p in the time period from $t_k$ to $t_{k+1}$, $D_{t_k \sim t_{k+1}}(p)$ is a positive number, indicating a positive event cumulative number at p, $D_{t_k \sim t_{k+1}}(p)$ is a negative number, indicating a negative event cumulative number at p, $N^{neg}$ represents the negative event cumulative map, $N^{neg}_{t_k \sim t_{k+1}}(\ )$ represents the negative event cumulative map in the time period from $t_k$ to $t_{k+1}$, $N^{neg}_{t_k \sim t_{k+1}}(p)$ represents the negative event cumulative map of p in the time period from $t_k$ to $t_{k+1}$, $S_{0 \sim t_{k+1}}(\ )$ represents a cumulative number of events in a time period of $0 \sim t_{k+1}$, $S_{0 \sim t_{k+1}}(p)$ represents the cumulative number of events of p in the period of $0 \sim t_{k+1}$, $S_{0 \sim t_k}(\ )$ represents a cumulative number of events in a time period of $0 \sim t_k$, $S_{0 \sim t_k}(p)$ represents the cumulative number of events of p in the time period of $0 \sim t_k$, wherein, $S_{0 \sim t_{k+1}}(p)$ is obtained by the following formula:

$$\begin{cases} S_{0 \sim t_{k+1}}(p) = \text{floor}(\hat{S}_{0 \sim t_{k+1}}(p)) + r_{t_{k+1}}(p) \\ \hat{S}_{0 \sim t_{k+1}}(p) = \dfrac{\log(I_{t_{k+1}}(p)) - \log(I_{t_0}(p))}{\theta(p)} \end{cases},$$

wherein, floor( ) represents a function of rounding to 0, $\hat{S}_{0 \sim t_{k+1}}(\ )$ represents the cumulative number of events obtained by calculating a brightness change of $I_{t_{k+1}}(p)$ of the $k+1^{th}$ frame and $I_{t_0}(\ )$ of a $0^{th}$ frame in the time period of $0 \sim t_{k+1}$, $\hat{S}_{0 \sim t_{k+1}}(p)$ represents the cumulative number of events of p obtained by calculating the brightness change of $I_{t_{k+1}}(p)$ of the $k+1^{th}$ frame and $I_{t_0}(p)$ of the $0^{th}$ frame in the time period of $0 \sim t_{k+1}$, floor $(\hat{S}_{0 \sim t_{k+1}}(p))$ means rounding $\hat{S}_{0 \sim t_{k+1}}(p)$ towards 0, $r_{t_{k+1}}(\ )$ represents a event correction function at time $t_{k+1}$, $r_{t_{k+1}}(p)$ represents a event correction value of p at time $t_{k+1}$, log( ) represents a logarithmic function, $I_{t_{k+1}}(\ )$ represents a brightness value at time $t_{k+1}$, $I_{t_{k+1}}(p)$ represents the brightness value of p in the frame at time $t_{k+1}$, $I_{t_0}(\ )$ represents the brightness value at time $t_0$, $I_{t_0}(p)$ represents the brightness value of p in the frame at time $t_0$, $\theta(p)$ represents the event camera sampling threshold of p, wherein, $r_{t_{k+1}}(p)$ is obtained by the following formula:

$$r_{t_{k+1}}(p) = \begin{cases} -1, & \text{floor}(\hat{S}_{0 \sim t_{k+1}}(p)) > \text{floor}(\hat{S}_{0 \sim t_k}(p)) \wedge \hat{S}_{0 \sim t_{k+1}}(p) < 0 \\ 1, & \text{floor}(\hat{S}_{0 \sim t_{k+1}}(p)) < \text{floor}(\hat{S}_{0 \sim t_k}(p)) \wedge \hat{S}_{0 \sim t_{k+1}}(p) > 0, \\ r_{t_k}(p), & \text{floor}(\hat{S}_{0 \sim t_{k+1}}(p)) = \text{floor}(\hat{S}_{0 \sim t_{k+1}}(p)) \end{cases}$$

wherein, $\hat{S}_{0 \sim t_k}(\ )$ represents the cumulative number of events obtained by calculating the brightness change of $I_{t_k}(\ )$ of the $k^{th}$ frame and $I_{t_0}(\ )$ of the $0^{th}$ frame in the time period of $0 \sim t_k$, $\hat{S}_{0 \sim t_k}(p)$ represents the cumulative number of events of p obtained by calculating the brightness change of $I_{t_k}(p)$ of the $k^{th}$ frame and $I_{t_0}(p)$ of the $0^{th}$ frame in the time period of $0 \sim t_k$, floor $(\hat{S}_{0 \sim t_k}(p))$ means rounding $\hat{S}_{0 \sim t_k}(p)$ towards 0, $r_{t_k}(p)$ represents the event correction function at time $t_k$, $r_{t_k}(p)$ represents the event correction value of p at time $t_k$, $\wedge$ represents a logical AND operation; when $\hat{S}_{0 \sim t_{k+1}}(p) < 0$, that is, the cumulative events in the time period of $0 \sim t_{k+1}$ are negative events, if the positive event floor $(\hat{S}_{0 \sim t_{k+1}}(p)) > \text{floor}(\hat{S}_{0 \sim t_k}(p))$ is generated during the time period $t_k \sim t_{k+1}$, then a positive error will be produced due to an action of the floor( ) function, the above positive error is to record one more positive event, set $r_{k+1}(p) = -1$ to correct the positive error; when $\hat{S}_{0\sim t_{k+1}}(p)>0$, if a negative event occurs in the time period $t_k\sim t_{k+1}$, a negative error will be produced; the above negative error is to record one more negative event, set $r_{t_{k+1}}(p)=1$ to correct the above negative error; when no event is generated in the time period $0\sim t_{k+1}$, correction shall be made if correction has been made in the last period of time, and correction shall not be made if no correction has been made in the last period of time; in other cases, no correction shall be made, that is, $r_{t_{k+1}}(p)=0$.

5. The method of claim 4, wherein the performing generative adversarial learning on the simulated event camera data and pre-acquired event camera shooting data to update the event camera contrast threshold distribution information to obtain the updated event camera contrast threshold distribution information, includes:
   performing data processing on the simulated event camera data and the pre-acquired event camera shooting data to obtain an event characterization information;
   performing divide-and-conquer processing on the event characterization information to obtain a divided and conquered event characterization information, wherein, the divide-and-conquer processing includes the following steps to: divide the event characterization information into blocks to obtain a plurality of characterization blocks; perform feature analysis on each of the plurality of characterization blocks to generate a feature hash key value, and obtain a feature hash key value set; based on the feature hash key value set and a preset hash table, determine a plurality of discriminator network models corresponding to the plurality of characterization blocks; use the plurality of discriminator network models to determine whether the event characterization information of the plurality of characterization blocks satisfies a preset condition, update the event camera contrast threshold distribution information according to the pre-obtained data distribution to obtain the updated event camera contrast threshold distribution information, wherein, features in the feature analysis include: a gradient angle, a gradient strength and a feature divergence.

6. The method of claim 5, wherein the performing data processing on the simulated event camera data and the pre-acquired event camera shooting data to obtain the event characterization information, includes:
   determining a first positive event cumulative map $M_r^{pos}$ and a first negative event cumulative map $M_r^{neg}$ of the pre-acquired event camera shooting data within a predetermined time period;
   determining a second positive event cumulative map $M_g^{pos}$ and a second negative event cumulative map $M_g^{neg}$ of the simulated event camera data within the predetermined time period;
   using the following formulas to find the gradients for the first positive event cumulative map, the first negative event cumulative map, the second positive event cumulative map and the second negative event cumulative map respectively, to obtain a first event characterization information and a second event characterization information as the event characterization information:

$$G=|g_x(M)|+|g_y(M)|,$$

wherein, G represents the event characterization information, $g_x(\ )$ means to seek a gradient in a direction x of coordinate axis, and M represents the event cumulative map, that is, a general term of the first positive event cumulative map, the first negative event cumulative map, the second positive event cumulative map, and the second negative event cumulative map, $g_x(M)$ means that M seeks a gradient in the direction x of coordinate axis, and x represents a horizontal direction of coordinate axis, $g_y(M)$ means that M seeks a gradient in a direction y of coordinate axis, and y represents a vertical direction of coordinate axis; the coordinate axis takes an upper left corner of the frame as an origin, a direction of a width of the frame to the right as a positive half-axis of x-axis, and a direction of a height of the frame downward as a positive half-axis of y-axis, wherein the event characterization information is:

$$\begin{cases} E_r = \{M_r^{pos}, M_r^{neg}, G_r^{pos}, G_r^{neg}\} \\ E_g = \{M_g^{pos}, M_g^{neg}, G_g^{pos}, G_g^{neg}\} \\ \quad E_r \in R^{4\times H\times W} \\ \quad E_g \in R^{4\times H\times W} \end{cases},$$

wherein, $E_r$ represents the first event characterization information, E represents the event characterization information, r represents the pre-acquired event camera shooting data, $M_r^{pos}$ represents the first positive event cumulative map, $M_r^{neg}$ represents the first negative event cumulative map, $G_r^{pos}$ represents a gradient of $M_r^{pos}$, $G_r^{neg}$ represents a gradient of $M_r^{neg}$, $E_g$ represents the second event characterization information, g represents the simulated event camera data, $M_g^{pos}$ represents the second positive event cumulative map, $M_g^{neg}$ represents the second negative event cumulative map, represents a gradient of $M_g^{pos}$, represents a gradient of $M_g^{neg}$, R stands for a set of real numbers, H represents a height of the feature, and W represents a width of the feature.

7. The method of claim 6, wherein the performing divide-and-conquer processing on the event characterization information to obtain the divided and conquered event characterization information, includes:
   dividing the event characterization information E by grid block partition, into 16 blocks of 4×4, resulting in a characterization block $$\mathcal{P} \in R^{4\times \frac{H}{4}\times \frac{W}{4}},$$

wherein, $\mathcal{P}$ represents the characterization block, R represents the set of real numbers, H represents the height of the feature, and W represents the width of the feature;
   performing structural analysis on the plurality of characterization blocks by means of a hash function, and selecting a corresponding discriminator network model according to a hash value for subsequent processing, a output result of the discriminator network model corresponding to $\mathcal{P}$ being expressed by the following formula:

$$D(\mathcal{P})=\Sigma_k ind(s(\mathcal{P})=k)\times D_k(\mathcal{P}),$$

wherein, $\mathcal{P}$ represents the characterization block, $D(\ )$ represents the discriminator network model, $D(\mathcal{P})$ represents the output result of the discriminator network model corresponding to $\mathcal{P}$, k represents a sequence number of the discriminator network model, $ind(\ )$ represents an indicative function which has a value of 1 when the condition is true and of 0 when the condition is not true; s( ) represents a hash function, s($\mathcal{P}$) represents a return value of $\mathcal{P}$ input into the hash function, $D_k$( ) represents a $k^{th}$ discriminator network model, $D_k(\mathcal{P})$ represents the output result of $\mathcal{P}$ input into the $k^{th}$ discriminator network model, $\Sigma_k$ means summing the output results of all the discriminator network models;

analysis steps of the gradient angle and the gradient strength are to as follows:

determine a gradient of each characterization block, resulting in a gradient matrix;

determine a feature value $\{\lambda_1, \lambda_2\}$ and a feature vector $\{\phi_1, \phi_2\}$ of the gradient matrix;

the gradient angle φ and gradient strength γ are calculated by the following formula:

$$\begin{cases} \varphi = \arctan(\phi_1, \phi_2) \\ \gamma = \dfrac{\sqrt{\lambda_1} - \sqrt{\lambda_2}}{\sqrt{\lambda_1} + \sqrt{\lambda_2}} \\ c(m) = \sum_{p \in P(m)} \sum_{q \in N(p)} \|\nabla_m(p,q)\|^2 \times O[\nabla_m(p,q)] \end{cases},$$

wherein, φ represents the gradient angle, arctan(,) represents a arc tangent function, arctan($\phi_1, \phi_2$) represents the arc tangent function of $\phi_1$ and $\phi_2$, $\phi_1$ represents the feature vector in the direction x of coordinate axis, $\phi_2$ represents the feature vector in the direction y of coordinate axis, γ represents the gradient strength, $\sqrt{\lambda_1}$ represents a square root of the feature value in the direction x of coordinate axis, $\sqrt{\lambda_2}$ represents a square root of the feature value in the direction y of coordinate axis, c(m) represents the feature divergence of m, m represents the characterization block, c( ) represents the feature divergence, q represents a neighboring pixel of pixel p, p( ) represents a set of all pixels in the characterization block, P(m) represents a set of all pixels in a $m^{th}$ characterization block, N( ) represents a 4-neighborhood of a pixel, and N(p) represents a 4-neighborhood of pixel p, represents the gradient of pixel p and neighboring pixels, $\|\ \|^2$ means a square of a norm, O[ ] represents a probability, $O[\nabla_m(p,q)]$ represents a probability of $\nabla_m(p,q)$.

8. The method of claim 7, wherein the using the plurality of discriminator network models to determine whether the event characterization information of the plurality of characterization blocks satisfies a preset condition and updating the event camera contrast threshold distribution information according to the pre-obtained data distribution to obtain the updated event camera contrast threshold distribution information, includes:

quantifying the gradient angle, gradient strength and feature divergence into three levels of 24, 3 and 3, respectively;

setting 216 discriminator network models, wherein, each discriminator network model in the 216 discriminator network models is composed of a multilayer perceptron network structure, the multilayer perceptron network structure consists of three linear layers, and a number of channels of each of the three linear layers is 256, 128 and 1, respectively, wherein, the 216 discriminator network models have different confidence levels due to different amounts of training data, and the event camera contrast threshold distribution information is updated by the following formula:

$$\begin{cases} \omega_k = \alpha \times \dfrac{1}{K} + (1-\alpha) \times \dfrac{S_k}{\sum_k S_k} \\ L_D = \mathcal{E}_{E_r \sim P_r(E_r)}[D(E_r)] - \mathcal{E}_{E_g \sim P_g(E_g)}[D(E_g)] \end{cases},$$

wherein, $\omega_k$ represents a confidence level of the $k^{th}$ discriminator network model, k represents the sequence number of the discriminator network model, ω represents a confidence level of the discriminator network model, α represents an equilibrium parameter, a value of α is α=0.5, K represents data trained by the discriminator network model, a value of K is K=216, S represents an amount of data trained by the discriminator network model, $S_k$ represents an amount of data trained by the $k^{th}$ discriminator network model, $\Sigma_k S_k$ represents a summation of the amount of data trained by the 216 discriminator network models, that is, seeking a total amount of data, $L_D$ represents an adversarial learning loss function of the discriminator network model, L represents a loss function, D represents adversarial learning of the discriminator network model, $E_r$ represents the first event characterization information, E represents the event characterization information, r represents the pre-acquired event camera shooting data, $P_r$( ) represents data distribution of the pre-acquired event camera shooting data, $P_r(E_r)$ represents data distribution of pre-acquired event camera shooting data conforming to $E_r$, P represents data distribution, D( ) represents the discriminator network model, $E_g$ represents the second event characterization information, g represents the simulated event camera data, $P_g$( ) represents data distribution of the simulated event camera data, $P_g(M_g)$ represents data distribution of the simulated event camera shooting data conforming to $E_g$.

9. The method of claim 8, wherein the generating the simulated event camera data based on the updated event camera contrast threshold distribution information, the video frame sequence and a preset noise signal, includes:

based on the updated event camera contrast threshold distribution information, performing event camera contrast threshold sampling on each pixel in various video frames in the video frame sequence to generate an event camera contrast threshold, to obtain an event camera contrast threshold group sequence;

performing pseudo-parallel event data simulation generation processing on the event camera contrast threshold group sequence and the video frame sequence to obtain the event camera data;

adding the preset noise signal to the event camera data to obtain simulated event camera data.

10. A data simulation device for an event camera, comprising:

a decode unit, configured to decode an acquired video to be processed, to obtain a video frame sequence;

an input unit, configured to input a target video frame from the video frame sequence into a fully convolutional network UNet to extract an event camera contrast threshold distribution information corresponding to the target video frame, thereby obtaining the event camera contrast threshold distribution information;

a sampling unit, configured to, based on the event camera contrast threshold distribution information, sample each pixel in the target video frame to generate an event camera contrast threshold, and obtain an event camera contrast threshold set;

a pseudo-parallel event data simulation generation processing unit, configured to perform pseudo-parallel event data simulation generation processing on the event camera contrast threshold set and the video frame sequence, to obtain simulated event camera data;

a generative adversarial learning unit, configured to perform generative adversarial learning on the simulated event camera data and pre-acquired event camera shooting data, to update the event camera contrast threshold distribution information, to obtain an updated event camera contrast threshold distribution information, wherein a similarity between the updated event camera contrast threshold distribution information and real data of a target domain is greater than a first predetermined threshold;

a generating unit, configured to generate the simulated event camera data based on the updated event camera contrast threshold distribution information, the video frame sequence and a preset noise signal, wherein the simulated event camera data is data whose similarity with the pre-acquired event camera shooting data is greater than a second predetermined threshold.

* * * * *